US007308443B1

(12) United States Patent
Lee et al.

(10) Patent No.: US 7,308,443 B1
(45) Date of Patent: Dec. 11, 2007

(54) TECHNIQUES FOR VIDEO RETRIEVAL BASED ON HMM SIMILARITY

(75) Inventors: Dar-Shyang Lee, Union City, CA (US); Jonathan J. Hull, San Carlos, CA (US); Gregory J. Wolff, Redwood City, CA (US)

(73) Assignee: Ricoh Company, Ltd., Tokyo (JP)

( * ) Notice: Subject to any disclaimer, the term of this patent is extended or adjusted under 35 U.S.C. 154(b) by 344 days.

(21) Appl. No.: 11/021,717

(22) Filed: Dec. 23, 2004

(51) Int. Cl.
*G06F 17/30* (2006.01)

(52) U.S. Cl. .......................... 707/3; 707/5; 707/104.1; 704/1; 704/256.1; 382/220

(58) Field of Classification Search .............. 707/1–10, 707/100–104.1, 200–206; 704/252, 256, 704/256.1, 256.2, 1–9, 255, 256.3, 256.4, 704/256.5; 382/106, 305, 228–230; 710/200, 710/220, 240; 715/503–510
See application file for complete search history.

(56) References Cited

U.S. PATENT DOCUMENTS

2002/0150300 A1* 10/2002 Lee et al. .................... 382/229

OTHER PUBLICATIONS

Hiroshi Matsumoto et al., A Frequency-weighted HMM Based on Minimum Error Classification for Noise Speech Recognition, Apr. 21-24, 1997, IEEE, 1511-1514.*
Stefan Eickeler, Face Database Retrieval Using Pseudo 2D Hidden Markov Models, May 20-21, 2002, IEEE, 58-63.*
Bahlmann, Claus et al.; "Measuring HMM Similarity with the Bayes Probability of Error and its Application to Online Handwriting Recognition"; 2001, *Proceedings of the ICDAR*, pp. 406-4111.
DeMenthon, Daniel et al.; "Relevance Ranking of Video Data Using Hidden Markov Model Distances and Polygon Simplification"; 2000, *Visual* LNCS 1929, pp. 49-61.
Dimitrova, N. et al.;"Content-based Video Retrival by Example Video Clip"; 1997, *SPIE*, vol. 3022, pp. 59-71.
Do, M.N.; "Fast Approximation of Kullback-Leibler Distance Trees and Hidden Markov Models"; 2003, *IEEE Signal Processing Letters*, vol. 10, No. 4, pp. 115-118.
Eickeler, S. et al.; "Content-Based Video Indexing of TV Broadcast News Using Hidden Markov Models"; 1999, *Proceedings of the ICASSP*, pp. 2997-3000.
Falkhausen, M. et al.; "Calculation of Distance Measures between Hidden Markov Models"; 1995, *Proceedings of EuroSpeech*, pp. 1487-1490.
Flickner, Myron et al.;"Query by Image and Video Content: The QBIC System"; 1995, *Computer*, vol. 28, No. 9, pp. 23-32.
Juang B.H. et al.; "A Probabilistic Distance Measure for Hidden Markov Models"; 1985, *AT&T Technical Journal*, vol. 62, No. 2, pp. 391-408.

(Continued)

*Primary Examiner*—Jean Bolte Fleurantin
(74) *Attorney, Agent, or Firm*—Townsend and Townsend and Crew LLP

(57) ABSTRACT

A query is received. The query may be an object containing temporal information. A query model including static and temporal components is then determined for the object. A weighting for static and temporal components is also determined. The query model is then compared with one or more search models. The search models also include static and temporal components. Search results are then determined based on the comparison. In one embodiment, the comparison may compare the static and temporal components of the query model and the search model. A weighting of the differences between the static and temporal components may be used to determine the ranking for the search results.

30 Claims, 12 Drawing Sheets

OTHER PUBLICATIONS

Lienhart, R.; "Systematic Method to Compare and Retrieval Video Sequences"; 1998, *SPIE*, vol. 3312, pp. 271-282.

Lyngso, R.B. et al.; "Metrics and similarity measures for hidden Markov models"; 1999, *Proceedings of Intelligent System for Molecular Biology*, pp. 178-186.

Sebe, N. et al.; "Computer Vision and Image Understanding"; 2003, *Computer Vision and Image Understanding*, vol. 92, No. 2-3, pp. 141-146.

Veltkamp, Remco C. et al.; "A Survey of Content-Based Image Retrieval Systems"; 2002, *Content-Based Image and Video Retrieval*, pp. 47-101.

Vihola, M. et al.; "Two Dissimilarity Measures for HMMs and their Application in Phoneme Model Clustering"; 2002, *Proceedings of the ICASSP*, pp. 933-936.

"Mar. 8, 2004 VISMeister goes on sale"; http://www.ricoh.com/src/news/04_01-06.html, 1 page.

* cited by examiner

TECHNIQUES FOR VIDEO RETRIEVAL BASED ON HMM SIMILARITY

BACKGROUND OF THE INVENTION

The present invention generally relates to searching techniques and more specifically to techniques for using static and temporal components to search models of objects including temporal information.

As we advance in the information age, the information collected and searched, such as photos, music, movies and home videos, has become increasingly multimedia. The current search techniques for these media are still predominantly text-based, relying on manually or automatically associating keywords with objects for indexing. However, these techniques do not address an important usage where one wishes to look for media objects similar to a given one. This type of "query-by-example" requires a mechanism for comparing two media objects. In the text domain, examples for comparing the similarity of two documents are based on word usage. For images, visual similarities are determined based on color, texture and shape features. For media objects that contain a temporal component, such as video, the same technique developed for images is often used. For instance, two videos are compared frame by frame and the total difference determines their similarity. The technique is improved by some alignment procedure or searching for best-matching frames. However, these methods are still inherently based on static information.

Accordingly, improved techniques for searching an object including temporal information are desired.

BRIEF SUMMARY OF THE INVENTION

Embodiments of the present invention generally relate to techniques for searching objects containing temporal information.

In one embodiment, a query is received. The query may be an object containing temporal information. A query model including static and temporal components is then determined for the object. A weighting for static and temporal components is also determined. The query model is then compared with one or more search models. The search models also include static and temporal components. Search results are then determined based on the comparison. In one embodiment, the comparison may compare the static and temporal components of the query model and the search model. A weighting of the differences between the static and temporal components may be used to determine the ranking for the search results.

In one embodiment, a method for searching objects containing temporal information is provided. The method comprises: receiving a query; determining a query model for the query, the query model including query model static components and query model temporal components; determining weighting information for the query model static components and query model temporal components; comparing the query model with one or more search models for search objects containing temporal information using the weighting information, the one or more search models including search model static components and search model temporal components, wherein the comparison includes comparing the query model static components and query model temporal components with the search model static components and query model temporal components for each search model in the one or more search models; and determining search results based on the comparison.

In another embodiment, a method for searching objects using Hidden Markov Models (HMMs) is provided. The method comprises: receiving a query for a query object containing temporal information; determining a query HMM for the query; determining weighting information for the components in the query HMM; comparing the query HMM with one or more search HMMs using the weighting information, wherein the comparison includes comparing components in the query HMM with components in a search HMM for each of the one or more search HMMs; and determining search results based on the comparison.

In yet another embodiment, an interface configured to receive a search query is provided. The interface comprises: a query object corresponding to a query model, the query model including a temporal component and a static component; a search option configured to enable a search for similar objects, wherein the search is performed based on a weighting for temporal components and static components.

In another embodiment, an interface for displaying search results is provided. The interface comprises: a query object; and one or more of search objects, wherein the one or more search objects are determined based on a weighting of temporal components and static components, the search objects being arranged in the interface to show their relative similarity to the query object based on their temporal components and static components.

A further understanding of the nature and the advantages of the inventions disclosed herein may be realized by reference of the remaining portions of the specification and the attached drawings.

DETAILED DESCRIPTION OF THE INVENTION

Embodiments of the present invention search objects containing temporal information. Temporal information is information recorded over a period of time. The information recorded over a period of time may refer to information that may comprise information of one or more types. The one or more types may be in some integrated form. For example, recorded information may include one or more of text information, graphics information, animation information, video information, and the like. In one example, an object may be a video recording that contains five minutes of information. The information may vary over the five minute recording.

Objects containing temporal information may be represented by a sequence of feature vectors. A static information component describes the overall distribution of features as a collection of vectors without considering the ordering. Examples of features include key frames, color histograms, texture features, audio frequency coefficients, words, or detected events.

A temporal information component describes how the features change as a function of time over the duration of the object. It reflects ordering information in the feature vector sequence. Depending on the features, ordering information describes temporal information such as color changes, speaker transitions, turns of events, and so on. Patterns of the temporal information are not observable from the static distribution of the collection of feature vectors, and are explicitly modeled as a temporal distribution.

A model may be created to encapsulate the static and temporal information components of an object. In one embodiment, a hidden Markov model (HMM) may be used. A hidden Markov model (HMM) models a temporal distribution as probabilistic transitions among a discrete number of states with stationary distributions. A person skilled in the art should appreciate how to generate an HMM using an object including temporal information.

Embodiments of the present invention receive a search query. Search results for the query are then generated by comparing HMMs. Although HMMs are discussed, it will be understood that other models may be appreciated, such as Kalman filters and Dynamic Bayesian Networks.

Figure 1:
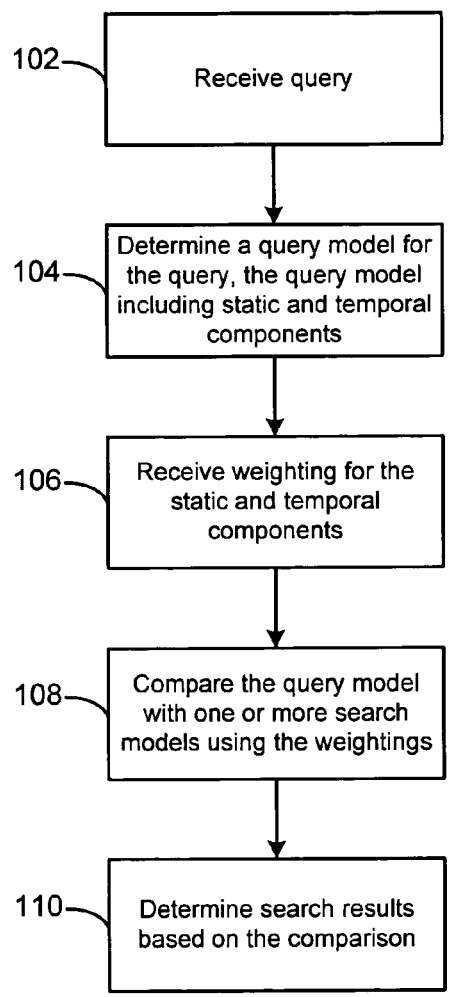
FIG. 1 depicts a simplified flowchart for performing a search according to one embodiment of the present invention.

FIG. 1 depicts a simplified flowchart 100 of a method for performing a search according to one embodiment of the present invention. In step 102, a query is received. The query may be any information that may be used to determine search results. For example, the query may specify an object containing temporal information. A user may select the object containing temporal information using an interface. The object containing temporal information may be specified by an identifier indicating where the object may be retrieved. For example, a uniform resource locator that references the stored object may be used.

In step 104, a query model is determined for the query. The query model includes information that is modeled as static and temporal components. In one embodiment, an HMM may be created using the object containing temporal information specified by the query. An HMM may include a sequence of features determined from the object. The HMM query model creation process will be described in more detail below. In another embodiment, instead of generating an HMM from an object containing temporal information, the query model may be specified in the query. For example, an HMM to use for the query may be specified.

In step 106, weightings for static and temporal components are received. The weightings may specify values for static and temporal components. For example, depending on the values received, more or less weight may be applied to static and/or temporal components.

The weightings indicate how important a component is compared to other components. For example, if a static component has a high weight, then it is assumed to be more important in a search process than other component with lower weights.

The weightings received may be in any form. For example, the weightings may indicate a weight for the two categories of static components and temporal components. For example, a range of 0-1 may be assigned to a static component category and a temporal component category. Also, individual features in the categories of static components and temporal components may be assigned different weights. For example, weightings for sound transitions, the number of users participating in a meeting, etc. may be received.

The weightings may be received from a user or determined automatically. In one embodiment, the weightings may be specified by a user and included in the search query. For example, a user may specify the weighting using a user interface. Also, in another embodiment, the weightings may be automatically determined by a search process. The weightings may be automatically determined based on many factors. For example, a process may determine that weighting static components higher may yield better search results based on the query received and may weight the static components more heavily than the temporal components.

In step 108, the query model is compared with one or more search models using the weightings. Although the terms search model or query model are used, it will be understood that search or query models may be generated using similar methods. For example, they may be both HMMs. The terms search model and query model are used to distinguish between a model associated with the search query and a model associated with a model being searched.

In one embodiment, static and temporal components for the query model are compared with static and temporal components for the search models. Differences between the static and temporal components of the query model and search models are determined. The weightings are then used to adjust the differences determined. A score may then be generated based on the adjusted differences. This process will be described in more detail below.

In step 110, search results are determined based on the comparison. For example, scores determined may be used to rank the search models. The ranking may indicate which search models are determined to be more relevant for the query. The static and temporal components of the search models may be fixed. However, depending on the weightings given to static and temporal components, a ranking of the different search models may be different for the same query depending on the weightings received.

Using weightings may be very useful in determining search results. Objects containing temporal information may include many different features. Depending on which components may be considered important, different objects may be more appropriate for a query. For example, when determining which videos are similar to a video, a user may desire a video with similar static components (e.g., similar color, texture, voice characteristics) or similar temporal components (e.g., the interaction of different sounds, voice transitions). Because there may be different components that can be compared in objects containing temporal information, the weightings specified by a user may be used to rank objects containing temporal information according to user preferences. Thus, search results may be determined that may be more appropriate for a query.

Figure 2:
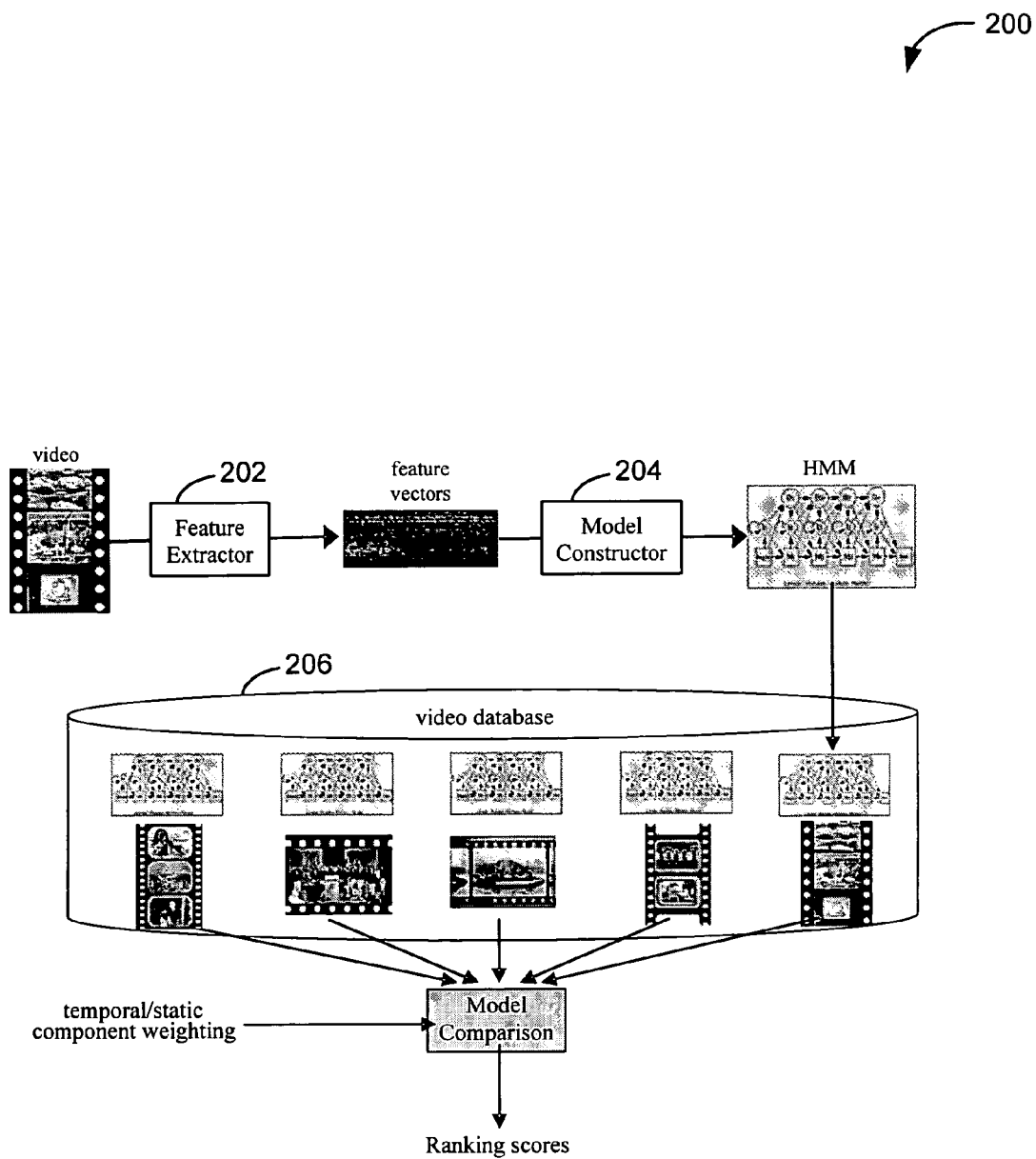
FIG. 2 depicts a simplified flowchart of a method for generating query models and/or search models according to one embodiment of the present invention.

FIG. 2 depicts a system 200 for generating query models and/or search models according to one embodiment of the present invention. In one embodiment, system 200 includes a feature extractor 202, a model constructor 204, and a database 206.

Feature extractor 202 is configured to determine features from an object containing temporal information. For example, feature extractor 202 may receive a video and output a sequence of feature vectors determined from the video. In one embodiment, the features may be a vector sequence representing audio frequency coefficients, such as Mel Frequency Cepstral Coefficients (MFCC), computed over a small window. In another embodiment, the features may be a sequence of color histograms computed for each frame. In another embodiment, the features may be voice characteristics computed for each speaker segment. Other features may also be appreciated by a person skilled in the art.

Model constructor 204 is configured to use the extracted features and construct a model for the object containing temporal information. For example, an HMM may be constructed using the extracted features. A person skilled in the art should appreciate how to construct an HMM.

A sequence of feature vectors may be extracted from the object containing temporal information. Each feature vector may represent characteristics computed from the object, such as voice characteristics of speakers in a meeting video; a color, texture, shape and features of a key frame; camera motion or scene transition effects; a high-level event such as intrusion detection in a surveillance video; etc. The characteristics may be computed over a short time window to determine the feature vectors. The distribution of feature vectors and their temporal transitions may be represented in an HMM. In one embodiment, the static component of the information may be represented by the model. For example, the static component is represented by the stationary probability and state emission probabilities. In one embodiment, the temporal component may be represented by the model. For example, the temporal component is represented in the state transition probabilities. The static and temporal components of the HMM may be compared with static and temporal components of other models to determine similarities and differences between the models.

Database 206 may be any storage device. It should be understood that although one database 206 is shown, search models may be stored in any number of databases 206. For example, a distributed environment, such as the Internet, may store many different models in various databases 206.

Each HMM generated by model constructor 204 may then be stored in database 206. When a comparison is performed, a ranking of models is generated based on weightings assigned to static and temporal components.

In another embodiment, models may be generated as needed. For example, if the user is interested in comparing only the audio aspect, a query model can be created from extracted audio feature vector sequence. If the user is interested in comparing only the visual similarity between videos, a query model can be constructed from extracted color histogram sequence.

Figure 3:
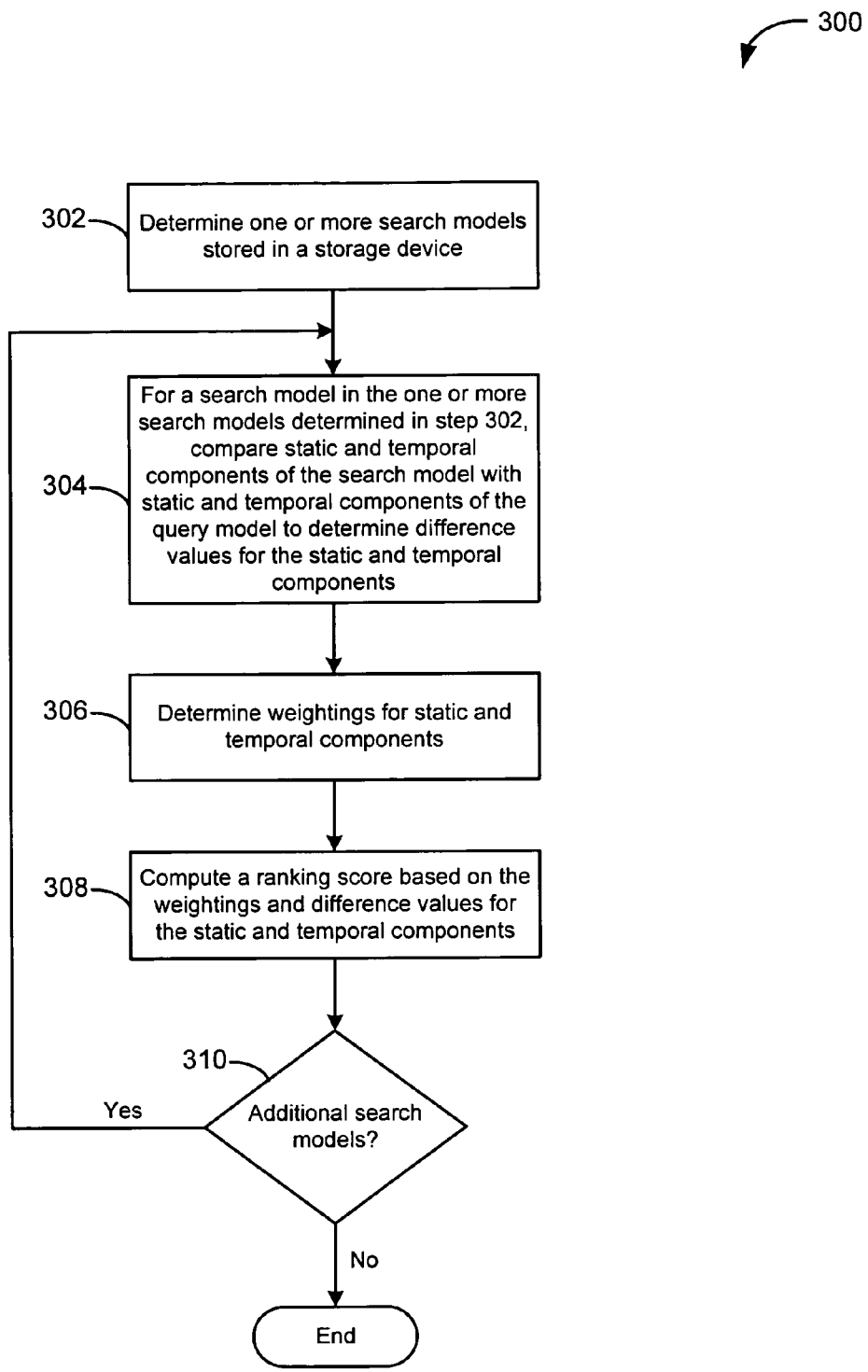
FIG. 3 depicts a simplified flowchart of a method for comparing the query model with one or more search models according to one embodiment of the present invention.

FIG. 3 depicts a simplified flowchart 300 of a method for comparing the query model with one or more search models as recited in step 108 of FIG. 1 according to one embodiment of the present invention. In step 302, one or more search models stored in database 206 are determined. In one embodiment, all search models stored in database 206 may be determined. Also, in another embodiment, subsets of search models in database 206 may be determined. For example, search models may be organized in categories, such as meetings, videos, advertisements, home videos, etc. Thus, if the user specifies in a query that meetings should be searched, then models in the meetings category are determined.

In step 304, for each of the one or more search models determined in step 302, static and temporal components of a search model in the one or more search models are compared with static and temporal components of the query model to determine differences between the static and temporal components of both models. In one embodiment, static and temporal components found in the query model may be compared with similar static and temporal components found in the search model. A difference value for each component may be determined.

In step 306, weightings for static and temporal components are determined. In one embodiment, the weightings may be specified by a user. As discussed above, the weightings may be for static components and/or temporal components as a group or may be for individual static and temporal components. The weightings indicate the relative importance of the components in relation to other components.

In step 308, a ranking score is computed based on the weightings and difference values for the static and temporal components. The ranking score indicates a relative score that may be used to rank various search models. For example, a higher ranking score may indicate a search model that may be more similar to the query model than a search model with a lower ranking score. The ranking score may be computed by multiplying the weightings for the static and temporal components by the difference values for the static and temporal components. For example, a weighting of 1.5 may be received for static components and a weighting of 0.5 may be received for temporal components. All difference values for static components may be multiplied by 1.5 and all difference values for temporal components may be multiplied by 0.5. The result of each multiplication may be summed to determine a ranking score. Although the above method of determining a ranking score is described, it will be understood that other methods of using the weightings to determine a ranking score may be appreciated. For example, the weightings may be divided into difference values, etc.

In step 310, it is determined if additional search models need to be compared. If there are additional search models, the process reiterates to step 304 where the process determines a ranking score for the new search model. If additional search models do not exist, then the process ends. A ranking of the search models may then be determined based on the computed ranking scores.

Figure 4:
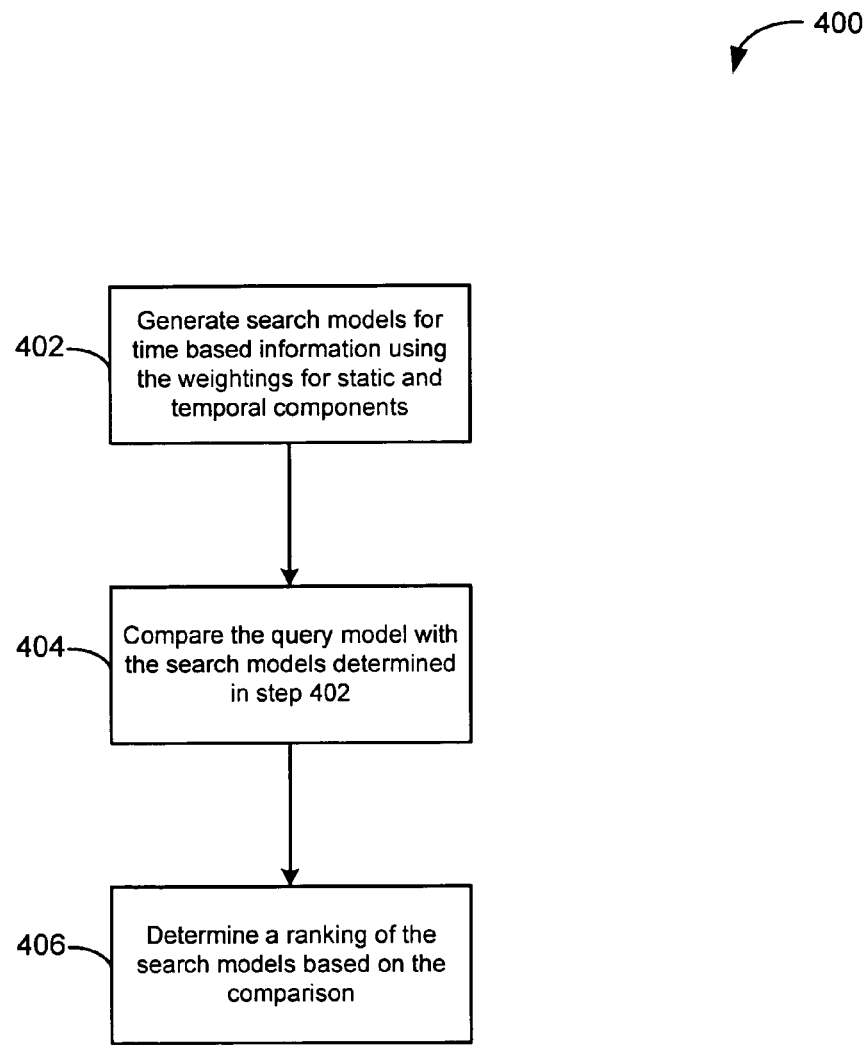
FIG. 4 depicts another embodiment of the comparing step according to one embodiment of the present invention.

FIG. 4 depicts another embodiment of the comparing step (step 108 of FIG. 1) according to one embodiment of the present invention. In step 402, search models are generated for an object using the variant information using the weightings received for the static and temporal components. In one embodiment, the object may be stored in a database 206. For example, the objects may be for different videos. For each video, a search model may be generated using the weightings for the static and temporal components.

In one embodiment, a search model for the object may be created that includes static and temporal components. Weightings may then be applied to the static and temporal components of the search model 208. For example, the weightings may be multiplied by values generated from the static and temporal components.

In step 404, the query model is compared with the search models determined in step 402. In one embodiment, difference values between static and temporal components between the query model and each search model determined in step 402 are determined. Difference values may be summed together into a total difference value. Search models that are more similar may have total difference values that are lower in value. Although this technique of comparing the query model and search models is described, it should be understood that other methods for comparing the query model and search model may be appreciated by a person skilled in the art.

In step 406, a ranking of the search models is determined based on the comparison. For example, search models with the lowest total difference value may be considered more similar or more relevant to the query received. Accordingly, a ranking of total difference values from lowest to highest may be determined. Search models may be ranked in this way and search results with the ranking returned to a user.

Figure 8:
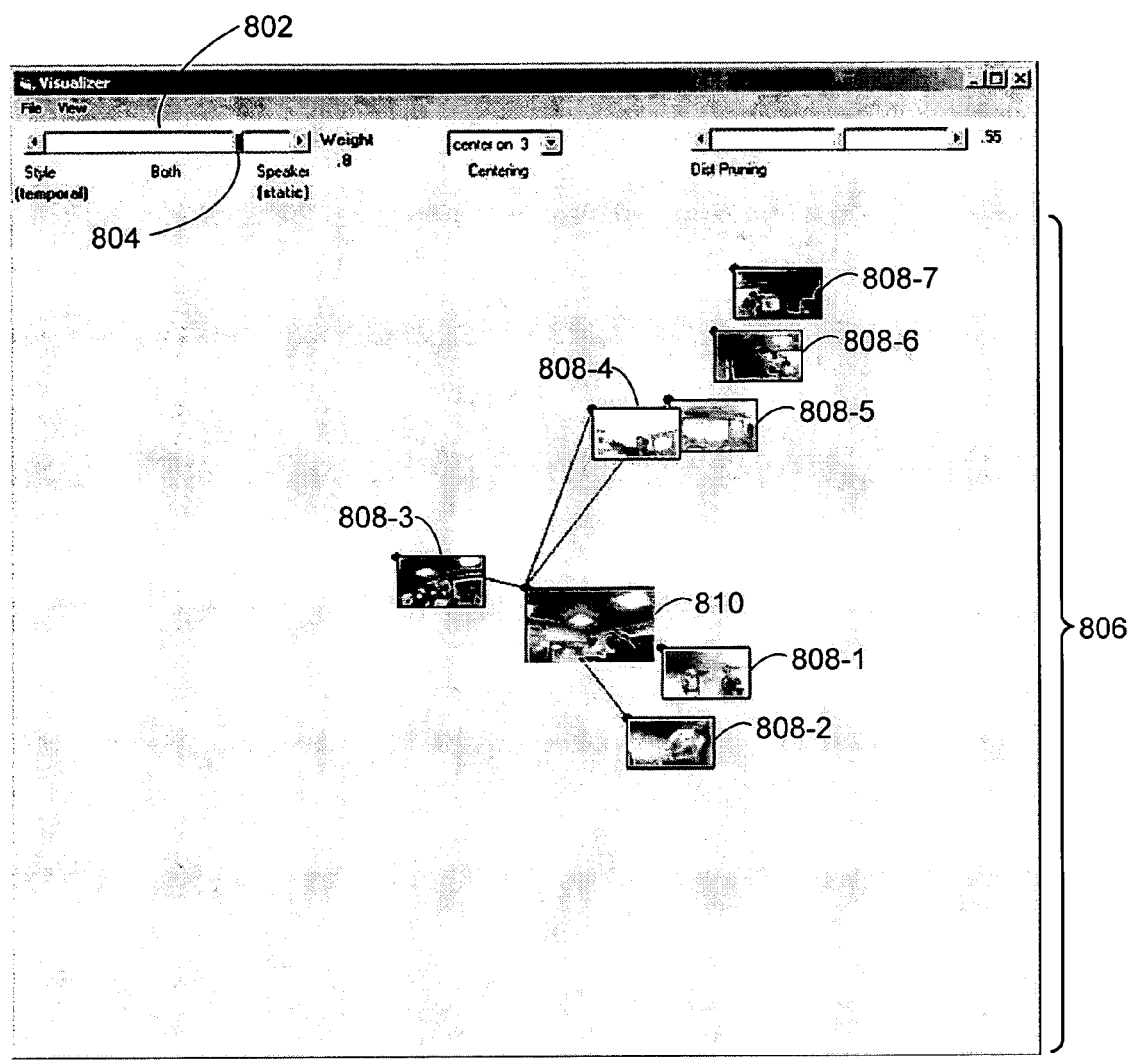
FIGS. 8-9 depict interfaces showing search results according to one embodiment of the present invention.

FIG. 8 shows an interface 800 showing search results according to one embodiment of the present invention. Interface 800 includes a weighting bar 802 that allows a user to specify a weighting. For example, a user may slide bar 804 between a temporal component end and a static component end. As the bar is slid towards either end, the weighting is changed. When the bar is closer to either end, the weighting is higher for the component at the end. As shown, a weighting is "0.8". The weighting may be between 0 and 1. Accordingly, a weighting of less than 0.5 weighs temporal components more than static components and a weighting of more than 0.5 weights static components more than temporal components.

Search results are shown in area 806. As shown, objects 808 are arranged in the center of area 806 around a query object 810. The closer objects 808 are to object 810 indicate their relative similarity to query object 810. For example, an object 808-1 may be the most similar to the search object. Other objects 808-2 and 808-3 may be less similar than object 808-1, etc.

Lines shown connection objects 808-1, 808-2, 808-3, 808-4, and 808-5, among other objects, indicate groupings if a threshold is put on the similarity score. Thresholding may be used to eliminate non-relevant objects to reduce the length of the ranked list or to reduce cluttering on interface 800. The connecting lines help to visual identify clusters of objects.

Figure 9:
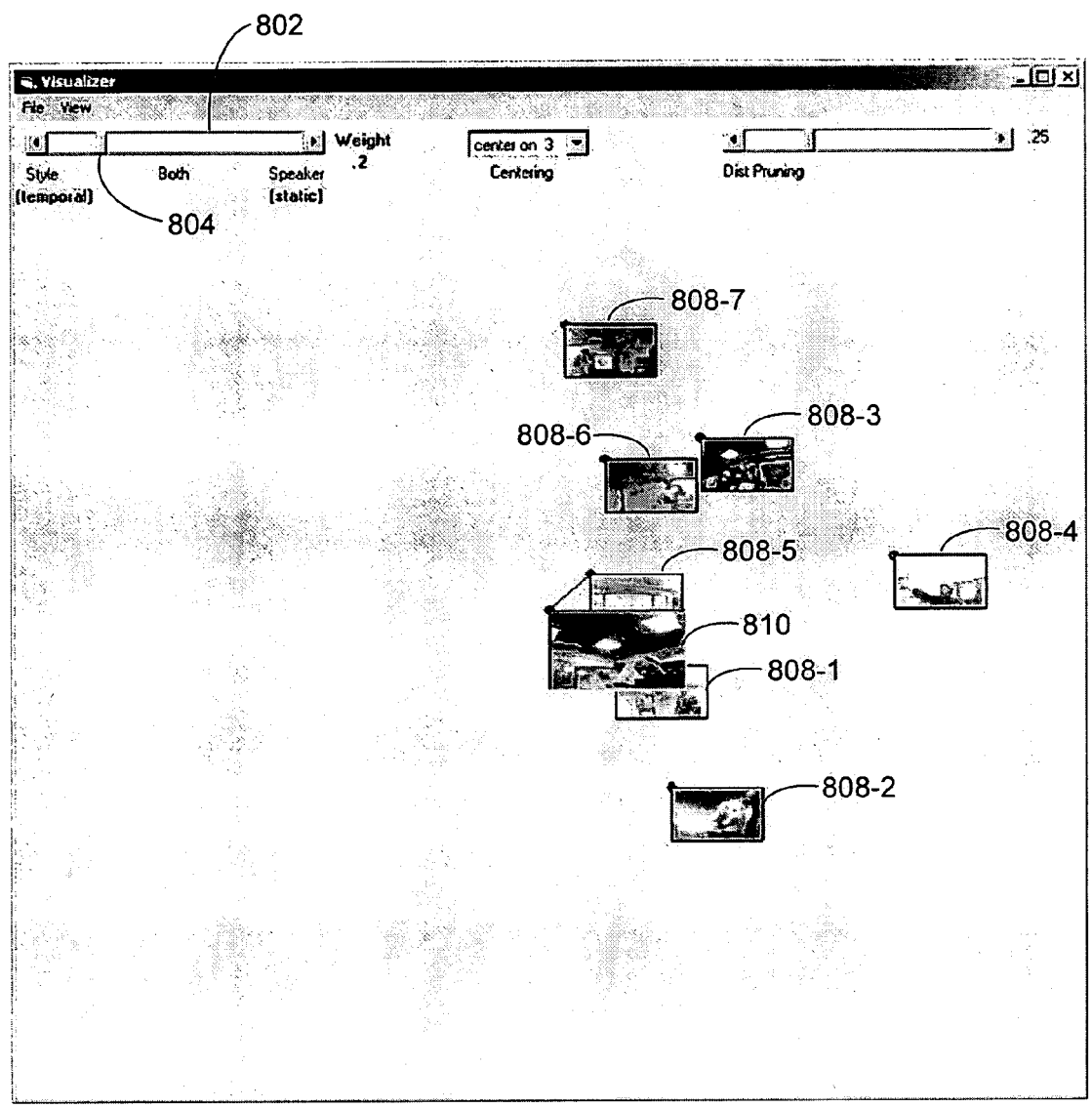

As weighting bar 802 is adjusted, the weights used to determine search results changes. Thus, the search rankings may change. FIG. 9 shows search results in an interface 900 with the weightings changed according to one embodiment of the present invention.

As shown, weighting bar 802 is at a weight of "0.2". This means temporal components are weighted higher than static components. The search result rankings have changed because of the difference in weighting. The objects closer to query object 810 are objects that have more similar temporal components. For example, objects 808-2, 808-3, and 808-4 are farther away from query object 810 in interface 900 than in interface 800. This may be because the static components of objects 808-2, 808-3, and 808-4 are more similar to the static components of query object 810. Also, objects 808-1, 808-6, and 808-7 are shown as closer to query object 810 in interface 900 than in interface 800. This may be because the temporal components of objects 808-1, 808-6, and 808-7 are more similar to the temporal components of query object 810.

As weighting bar 802 is adjusted, the objects 808 shown may be adjusted dynamically. For example, when a new weighting is specified, objects 808 are moved according to the new search result ranking calculated. Accordingly, search results may be generated on demand based on the weightings received with a query.

Figure 5:
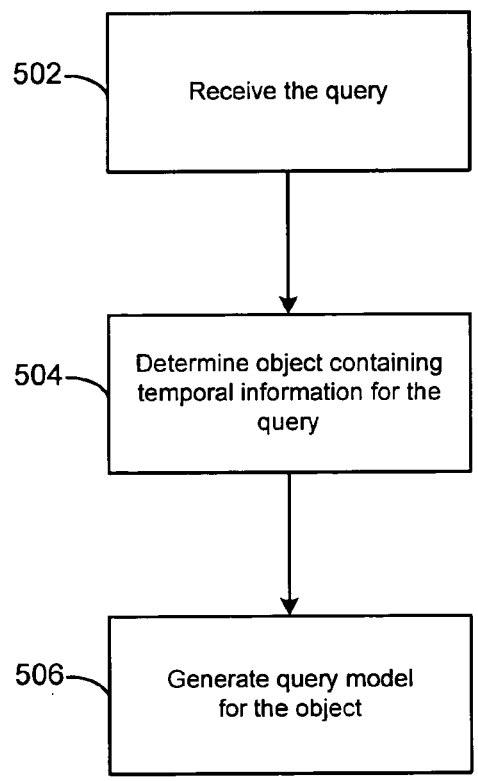
FIG. 5 depicts a simplified flowchart of a method for generating query models according to one embodiment of the present invention.

FIG. 5 depicts a simplified flowchart 500 of a method for generating query models according to one embodiment of the present invention. In step 502, a query is received. The query may be received from a user using a graphical user interface. An example of a graphical user interface used for providing a query is shown in FIG. 7 according to one embodiment of the present invention.

Figure 7:
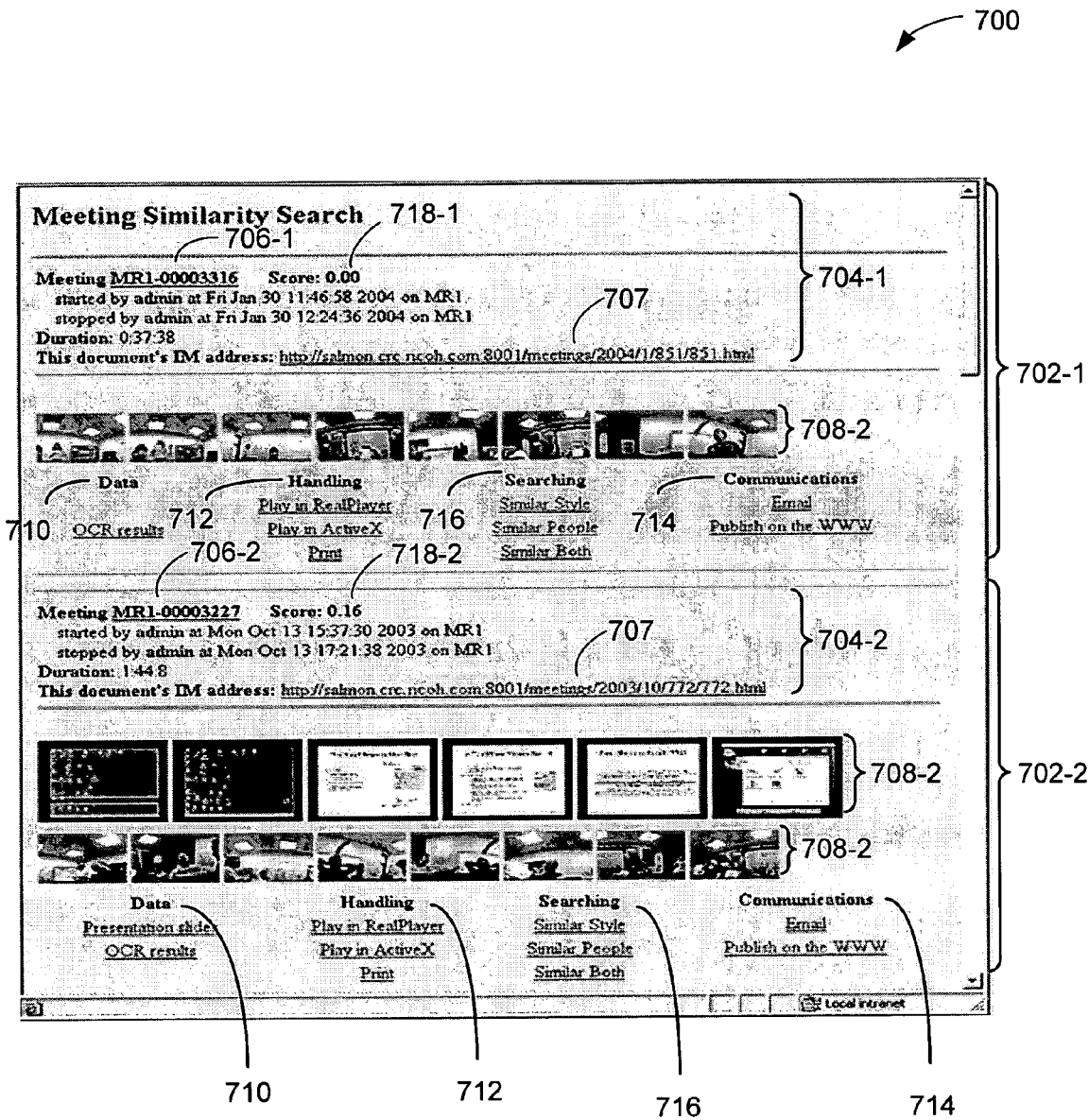
FIG. 7 depicts an interface for submitting a query according to one embodiment of the present invention.

As shown in FIG. 7, an interface 700 is provided. A first media object 702-1 and a second media object 702-2 are shown. Interface 700 may be used to perform a search and also shows a target object and search results for the target object. For example, one of these two objects may be specified as the query. A searching area 716 provides options for searching. For example, a similar style option, similar people option, or similar both option search may be performed. The similar style option weighs temporal components higher that static components. Also, the similar people option weighs static components higher than temporal components. The similar both option weighs temporal and static components equally. Accordingly, by selecting an object 702 and specifying an option for searching, similar objects may be searched for.

This interface also shows search results from a prior search. For example, a search may have been performed for similar objects for object 702-1. Search results yielded object 702-2 (other results are not shown). A score 718 is provided to indicate a relative similarity to the target object. Because object 702-1 is the target object, the score is zero. Object 702-2 score is 0.16 and can be used to determine how similar the object is in relation to other objects. For example, an object with a higher score may be less similar than object 702-2.

As shown, details for objects 702-1 and 702-2 are shown in description information area 706-1 and 706-2. Description information area 706 describes an object 702. For example, a meeting title 706-1 and 706-2 is shown for both objects 702-1 and 702-2. The duration and storage location 707 are also provided in the description information. Other description information may also be provided in description information area 706-1 and 706-2.

Sample key frames 708-1 and 708-2 are also shown. Key frames 708 allow a user to preview an object 702. For example, a user may look at the key frames and decide whether or not the object is what the user wanted to search for.

A data area 710 describes the data found in the object. For example, data area 710-1 shows that the data was generated using optical character recognition (OCR). Also, data area 710-2 shows that the data was generated using OCR and also includes presentation slides.

A handling area 712 provides options for playing an object 702. A communications are 714 provides options for communicating the object, such as by email or publishing it on the Web.

In step 504, an object containing temporal information is determined for the query. The object may be specified by the query. In one embodiment, an identifier associated with the query may be used to retrieve the object. For example, a storage location 707 may be used to determine the object 702.

In step 506, a query model is generated for the object. In another embodiment, the query model may have already been generated. In this case, the query model may be retrieved from storage.

Figure 6:
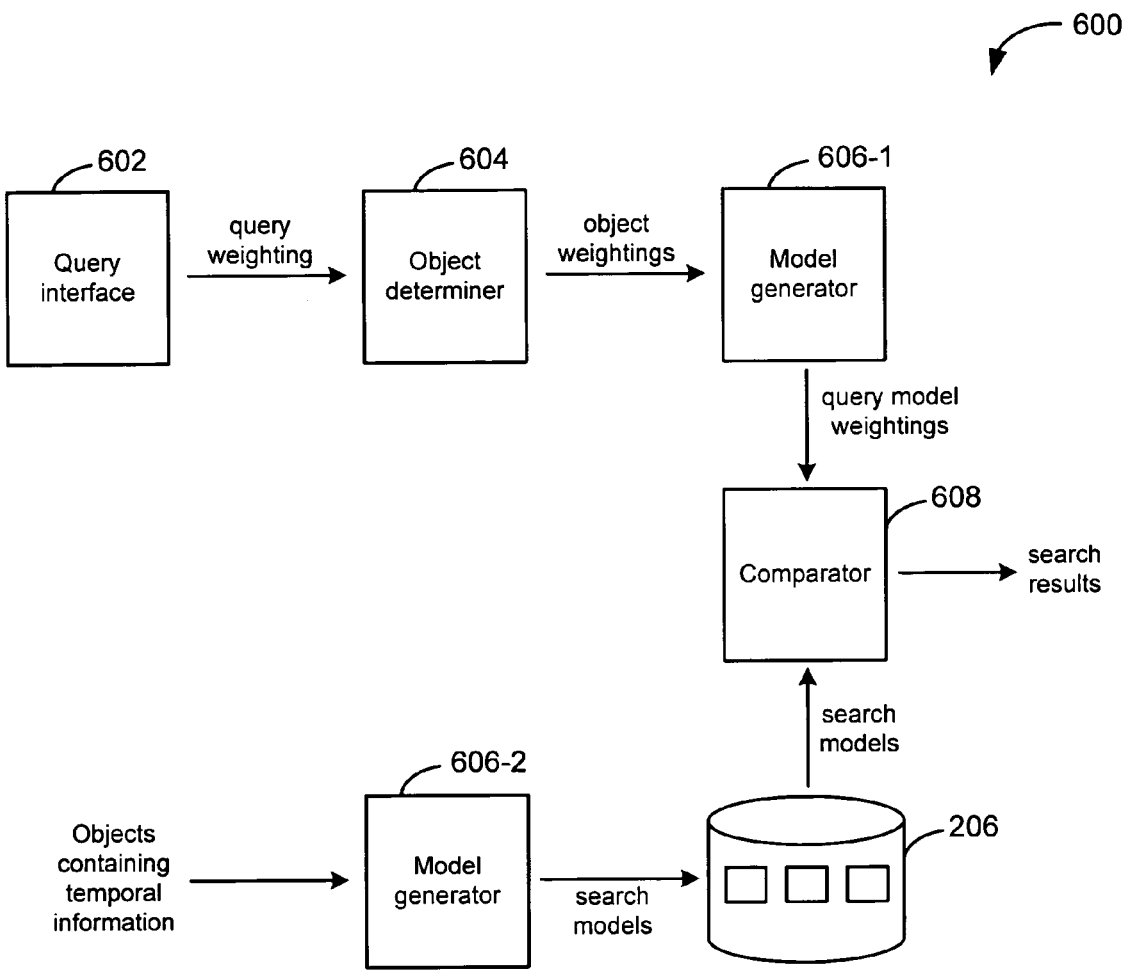
FIG. 6 depicts a simplified block diagram of modules used to perform functions of embodiments of the present invention.

FIG. 6 depicts a simplified block diagram 600 of modules used to perform functions of embodiments of the present invention. System 600 includes a query interface 602, a time variant information determiner 604, a model generator 606-1, a comparator 608, database 206, and a model generator 606-2.

Model generator 606-2 is configured to generate models for time variant information. In one embodiment, model generator 606-2 receives objects containing temporal information and generates search models. In one embodiment, a search model may be an HMM. The search models are then stored in database 206.

Query interface 602 is configured to receive a query from a user. Additionally, a user may input weightings using the query interface. The weightings specify weighting for static and/or temporal components of an object containing temporal information.

Object determiner 604 is configured to determine an object based on the query. For example, an identifier for the object may be received with the query. The identifiers are used to determine or retrieve objects. In another embodiment, query interface 602 may receive an object and send it to object determiner 604. Model generator 606-1 is configured to generate a query model using the object. In one embodiment, model generator 606-1 generates an HMM.

Comparator 608 is configured to output search results based on a comparison of the query model and search models using weightings. Comparator 608 uses the weightings to rank search models relative to the query model. In one embodiment, methods described in FIG. 3 and/or FIG. 4 may be used to determine the search results.

Accordingly, embodiments of the present invention provide many advantages. For example, objects containing temporal information may be searched using embodiments of the present invention. The search may use models that describe object. Additionally, users may specify weightings for temporal and static components of the model. Thus, objects containing temporal information may be searched using the weightings and more relevant searches may be performed.

Additionally, the use of a query by example process provides many advantages. For example, describing search terms for objects containing temporal information may be difficult. Using embodiments of the present invention, a user may find similar objects to objects specified in the search. A user may thus determine similar music or videos that include similar content based on the weightings for an object.

HMM Comparison

In this section, one embodiment of a proposed framework for meeting retrieval and the HMM representation of meetings is described.

Let each meeting $M_j$ be characterized by a vector sequence $X_j = \{x_j^1, x_j^2, \ldots, x_j^{T_j}\}$ where $x_j^t$ is a vector in the space of speaker features at time interval t and $T_j$ is the duration of for meeting $M_j$. The feature space can include audio-visual features that helps identify a particular speaker. This vector sequence is used to construct a respective HMM model $M_j = \{Q_j, \pi_j, A_j, B_j\}$ where $Q_j = \{q_j^1, \ldots, q_j^{n_j}\}$ is the set of $n_j$ discrete states, $\pi_j = (\pi_j^1, \ldots, \pi_j^{n_j})$ is the initial probabilities of the states, $\pi_j = (\pi_j^1, \ldots, \pi_j^{n_j})$ where $a_j^i = (a_j^{i1}, \ldots, a_j^{in_j})$ is the state transition probabilities, and $B_j = \{b_j^1, \ldots, b_j^{n_j}\}$ where $b_j^i(x)$ is the continuous symbol density function for state $q_j^i$. For any given X, an HMM representation produced in such a way that the states correspond to distinct speakers, with symbol probabilities reflecting the characteristics of the speakers in the feature space, and the style of interaction to be represented by the transition probabilities.

In one embodiment, the HMM can be trained directly on the input sequence X using a Baum-Welsh algorithm. However, this usually requires a more complex HMM with more states and lots of data.

An HMM may also be normally constructed to impose the one-to-one correspondence between states and speakers. First, unsupervised speaker clustering is performed on the feature vectors to identify n clusters $C_1 \ldots C_n$. The feature vectors can be improved significantly if augmented with speaker tracking by sound localization or object tracking. For example, the sound localization output produced by a meeting recorder system can separate the speakers quite accurately when participants are not moving. This audio direction data provides good frame segmentation boundaries for individual speakers, which is one of the biggest sources of errors for speaker clustering. Once the clusters have been identified, each cluster $C_k$ is represented by a corresponding state $q^k$ in the HMM. The transition probabilities can be calculated from X based on the cluster ID. For each speaker cluster, we perform vector quantization on all the vectors that belong to the cluster using LVQ to produce K codebook vectors. These codebooks are used to define the symbol probabilities of the state for that speaker.

Figure 10:
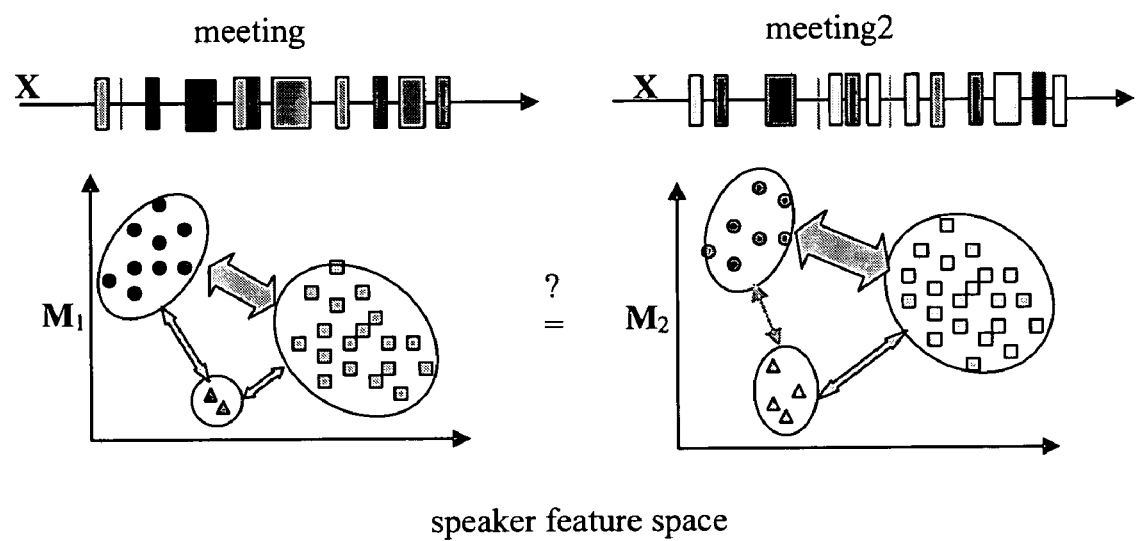
FIG. 10 depicts HMMs according to one embodiment of the present invention.

In one embodiment, $x_j^t$ is a 20-dimensional vector composed of order 10 MFCC coefficients and their derivatives computed over a 12 ms window. In theory, this sequence may be used to a continuous HMM with Gaussian mixture symbol densities directly. Also, explicit unsupervised speaker clustering using $x_j^t$ into $n_j$ classes may be used, and an HMM with $n_j$ states may be constructed. A discrete observation sequence is then generated using the labeled speaker cluster ID at a 2-second granularity. Therefore, $x_j^t = o_j^t \in \{1 \ldots n_j\}$ and $T_j = 60*60/2 = 1800$ for a one hour meeting. Transition probabilities $A_j$ are computed based on the labeled speaker transitions. The initial probability $\pi_j$ is set to be the stationary vector $v_j^t = v_j^t A_j$. The symbol density function is represented by 16 codebook vectors generated from all the audio feature vectors extracted for the corresponding speaker (cluster) segment. The codebooks are selected using an LVQ algorithm and silent segments are suppressed. FIG. 10 illustrates this representation. The top shows the feature vector sequence over time with vectors belonging to the same (but unknown) speaker coded in the same color. The bottom shows the HMM representation with the same color coded states covering the feature space. Speaker transitions are represented by gray arrows with the thickness proportional to the frequency. The location of vectors in the feature space indicates the similarities of these vectors (also shape coded by speaker identity). A scheme is developed for comparing these two meetings while taking into account the adjustable parameters $\alpha_{speaker}$ and $\alpha_{style}$. Therefore, two HMMs are compared. In general, these meeting HMMs are ergodic and do not have a constant number of states.

A similarity metric is developed between two meetings $M_1$ and $M_2$ in the form of $$S(M_1,M_2) = \alpha_{speaker} \cdot J_{speaker}(X_1;M_1|X_2;M_2) + \alpha_{style} \cdot J_{style}(X_1;M_1|X_2;M_2)$$

where $J_{speaker}$ and $J_{style}$ are similarity measures based on speaker features and meeting style, respectively, and $0 \leq \alpha_{speaker} \leq 1$, $0 \leq \alpha_{style} \leq 1$ are user parameters that control the relative importance between $J_{speaker}$ and $J_{style}$. It is expected that when $\alpha_{speaker} = 1$ and $\alpha_{style} = 0$ the system should retrieve meetings with similar participants regardless of the types of meeting. When $\alpha_{speaker} = 0$ and $\alpha_{style} = 1$, only meetings in the same category should be retrieved. Any values in between should weigh these factors appropriately.

Comparing HMM

Figure 11:
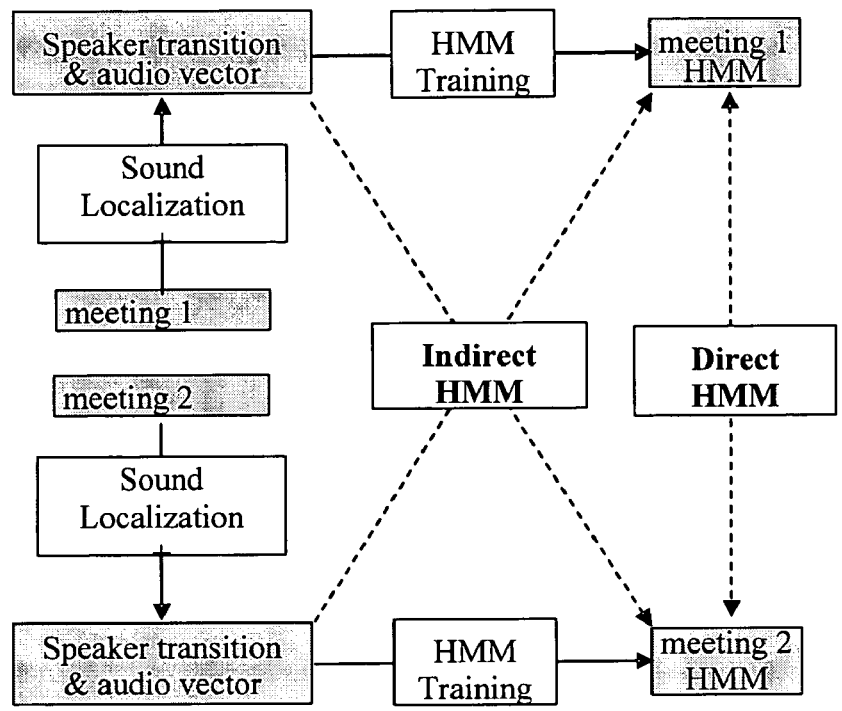
FIG. 11 depicts a method flow of comparing HMMs according to one embodiment of the present invention.

The overall framework and our chosen HMM representation is illustrated in FIG. 11. For one embodiment, a distance measure for distributions that is used, is the Kullback-Leibler Divergence (KLD).

$$D(f\|g) = \int_x f(x) \log \frac{f(x)}{g(x)}$$

Applying this measure requires computing the likelihood of an observed vector sequence under both models over all possible sequences. In one embodiment, parametric forms of the functions are used to simplify the calculation.

In one embodiment, this measure may be approximate by a Monte Carlo Simulation. The probability can be computed of an observed sequence under an HMM model using the forward algorithm in $O(N^2T)$, where N is the number of states and T is the length of the sequence. Therefore, $f(X) = P(X|M_1)$ and $g(X) = P(X|M_2)$ can be used to compute KLD with randomly sampled sequences X. For efficient sampling, random sequences can be generated using one HMM and the likelihood is computed under the other. Other variants using the same principle with different sampling schemes and function definitions may be used. For example, instead of overall likelihood, sequence probability under the most likely path computed by the Viterbi algorithm can be used. Nonetheless, they also involve calculating sequence probabilities under the models. The accuracy of this approach may improve as total observation length T increases; however, so does the running time.

To overcome the time-consuming simulation in high dimensional space, the second approach eliminates X altogether and directly compares model parameters under some state alignment. It has been shown that KLD between two ergodic HMMs with the same number of states is bounded by an equation with KLD computed individually over the transition and symbol probabilities. Similar approximation for special left-to-right HMMs with Gaussian mixture densities has also been proposed. These approximations can be computed in $O(N^2)$ time. The quality of the bounds or estimates depends on the assumed state alignment. For example, two identical HMMs can produce 0 divergence with the correct state alignment, and a vastly different result if the states are renumbered. Heuristics can be applied to improve alignment, and may be evaluated to ignore results one all possible permutations of state alignments, a $O(N^2N!)$ operation.

In the first approach, a dynamic programming algorithm (Forward or Viterbi) is used to compute sequence probability. In order to achieve the desired system behavior, the control parameters may be incorporated within the dynamic programming process. Since HMMs are evaluated through a vector sequence, this approach is referred to as the indirect approach. In the second approach, similarity is measured directly on model parameters. Therefore, control parameters are embedded in the KLD or distance metric equations. This is referred to as the direct approach and will be described in more detail below.

1. Meeting Comparison: Direct Approach

In this approach, a KLD is computed directly from the model parameters. It has been shown that the KLD between two HMMs as computed by an infinitely long observation sequence is bounded by the following equation $$D(M_1\|M_2) \leq \sum_{i=1}^{n} v_1^i (D(a_1^i\|a_2^i) + D(b_1^i\|b_2^i)). \quad (2)$$

where $v_1$ is the stationary vector of $M_1$. To compute KLD for the symbol probabilities, we use a similar upperbound derived for Gaussian mixtures $$D(b_1^i\|b_2^j) = D\left(\sum_{k=1}^{n} w_1^{ik} g(c_1^{ik}) \| \sum_{k=1}^{n} w_2^{jk} g(c_2^{jk})\right) \leq$$

$$D(w_1^i\|w_2^j) + \sum_{k=1}^{n} w_1^{ik} D(g(c_1^{ik})\|g(c_1^{jk}))$$

where g is the Gaussian centered at $c_j^{ik}$, the kth codebook vector of state $q_j^i$ of $M_j$. Assuming all components have equal weights, we approximate this by $$D(b_1^i\|b_2^j) = \frac{1}{K} \sum_{k=1}^{K} \min_{1 \leq r \leq K} \{\|c_1^{ik} - c_2^{jr}\|_{L2}\}$$

For each codebook in $q_1^i$, we find the closest codebook in $q_2^j$, and average the distances for all codebooks of $q_1^i$. Since HMM models were constructed by setting $\pi_j$ to the stationary vector $v_j$, this equation can be directly computed. However, this formulation assumes both HMMs have the same number of states, and the quality of the bound depends critically on the correct state alignment. All possible permutations of state alignment to obtain the best bound can be evaluated.

$$D_{min}(M_1\|M_2) = \min_{\psi_1^2} \left\{ \sum_{i=1}^{n/} \pi_1^i \left( D\left(a_1^i\|a_2^{\psi_1^2(i)}\right) + D\left(b_1^i\|b_2^{\psi_1^2(i)}\right) \right) \right\} \quad (3)$$

$$D\left(a_1^i\|a_2^{\psi_1^2(i)}\right) = \sum_{k=1}^{n} a_1^{ik} \log \frac{a_1^{ik}}{a_2^{\psi_1^2(i)\psi_1^2(k)}}$$

where $\psi_1^2 = \{\psi_1^2(1), \ldots, \psi_1^2(n_1)\}, 1 \leq \psi_1(i) \leq n_2$ is a mapping of states from $Q_1$ to $Q_2$, and $\Psi_1^2$ is the Compute $$D(M_1 \| M_2) = \sum_{i=1}^{n_1} v_1^i \left( \alpha_{style} \cdot D\left(a_1^i \| a_2^{\psi_1^2(i)}\right) + \alpha_{speaker} \cdot D\left(b_1^i \| b_2^{\psi_1^2(i)}\right) \right)$$

$$D\left(a_1^i \| a_2^{\psi_1^2(i)}\right) = \sum_{k=1}^{n} a_1^{ik} \log \frac{a_1^{ik}}{a_2^{\psi_1^2(i)\psi_1^2(k)}} \text{ or 0 if } \psi_1^2(i) \text{ undefined}$$

$$a_2^{\psi_1^2(i)\psi_1^2(k)} = \varepsilon \text{ if } \psi_1^2(k) \text{ undefined}$$

$$D\left(b_1^i \| b_2^{\psi_1^2(i)}\right) = \frac{1}{K} \sum_{k=1}^{K} \min_{1 \le r \le K} \left\{ \| c_1^{ik} - c_2^{\psi_1^2(i)r} \|_{L2} \right\} \text{ or 0 if } \psi_1^2(i) \text{ undefined}$$

set of all possible alignments.

Algorithm Variations

In one embodiment, the metric may not adequately account for the percentage of speaker's role in both meetings. Consider an example where the same person x attends two meetings where he dominates in meeting 1 with y but speaks very little in meeting 2 where z dominated. Assuming we are interested only in speaker features now. When states are matched up in these two meetings, a good score is produced when x aligns with itself because the symbol densities are alike. This leaves y to be aligned with z with a large divergence. However, the effect is mitigated because $v^{x y}$ is very small. This produces an undesirable effect of matching up presentations by a person with any meetings he attended regardless of how small a role he has in those meetings. To correct for this problem, we explicitly add a term to compare the speaker's role in both meetings. Therefore, we add a term in $D(M_i \| M_2)$ $$D(M_1 \| M_2) = \sum_{i=1}^{n_1} v_1^i \left( \alpha_{style} \cdot D\left(a_1^i \| a_2^{\psi_1^2(i)}\right) + \alpha_{speaker} \cdot D\left(b_1^i \| b_2^{\psi_1^2(i)}\right) \right)$$

$$+ D\left(v_1^i \| v_2^{\psi_1^2(i)}\right) \text{ code: } VKLD$$

Another issue is the handling of unmatched states. When comparing meetings with different number of speakers, some states in the meeting with more speakers may not have a matching state. If the unused states are the most active ones in the meeting, there may be some penalty for leaving them out regardless how well the rest of the states matched. A penalty may be determined. In the list above, there is no penalty when the states have no match. A penalty incurred is when the KLD of the transition probabilities is computed to an unmatched state by setting the non-existent link to $\epsilon$. One possibility is to let $v_2^{\psi_1^2(i)} = \epsilon$ when $\psi_1^2(i)$ is undefined, effectively applying a penalty of $D(v_1^i \| \epsilon)$. Another possibility is to simply use $v_1^i$ as penalty. After initial testing, we used $v_1^i$ as penalty.

$$D(M_1 \| M_2) =$$

$$\sum_{i=1}^{n_1} \begin{cases} v_1^i \left( \alpha_{style} \cdot D\left(a_1^i \| a_2^{\psi_1^2(i)}\right) + \alpha_{speaker} \cdot D\left(b_1^i \| b_2^{\psi_1^2(i)}\right) \right) + D\left(v_1^i \| v_2^{\psi_1^2(i)}\right) \\ v_1^i \text{ if } \psi_1^2(i) \text{ undefined} \end{cases}$$

code: CNULL

Evaluating all possible permutations of state alignment is an $O(\max(n_1, n_2)!)$ operation. Although for most meetings, n (the number of active speakers) is quite small, a more scalable solution that is not exponential may be desired. If this can be turned into a standard graph matching or shortest path problem, the complexity may be reduced. However, there may be several considerations. If the symbol probability term of Eq. (2) is computed, the dynamic programming can be used to find the best solution over all permutations. However, it may not be possible to use the same technique to compute the full equation. In order to compute the alignment of any state $q_1^i$ from $M_1$ and any state $q_2^j$ from $M_2$, the KLD between their transition probabilities $a_1^i$ and $a_2^j$ may be computed, which depends on the alignment of all other states. Since the full state alignment is required, we may not decompose Eq. (3) into sub-problems.

A simplification on Eq. (3) may be used to get around the problem. Instead of aligning all the states, all states in $M_1$ other than $q_1^i$ are tied together and all states in $M_2$ other than $q_2^j$ are tied together when evaluating KLD between $a_1^i$ and $a_2^j$. Thus we have $$D\left(a_1^i \| a_2^{\psi_1^2(i)}\right) \approx a_1^{ii} \log \frac{a_1^{ii}}{a_2^{\psi_1^2(i)\psi_1^2(i)}} + (1 - a_1^{ii}) \log \frac{1 - a_1^{ii}}{1 - a_2^{\psi_1^2(i)\psi_1^2(i)}}.$$

code: TSELF

With this important modification, the KLD between transition probabilities of two aligned states $q_1^i$ and $q_2^{\psi_1^2(i)}$ becomes independent of how the other states are aligned, just like KLD of the symbol probabilities. This allows Eq. (3) to be decomposed. This simplification also has a very nice interpretation. While the overall meeting style is reflected in the transition matrix, transitions between any particular pair of speakers may be very random and difficult to capture. By merging all states other than the one in consideration, Eq. (4) considers only self-bound versus out-going transitions at a state. The essence of a monologue versus an interactive conversation is preserved while variations in the specific participants and ordering of interaction are reduced. This modification also smoothes out the transition probabilities. Therefore, an additional scaling step may not be necessary.

The precise definition of state alignment may also be considered. If multiple states are permitted in one HMM to map onto the same state in the second, there are $n_1^{n_2}$ possible alignments. Although this definition is more general and automatically accounts for situations when unequal number of states, it presents several problems. When multiple states align with a single state, we need to merge their transition and symbol probabilities. We also need to define the associated cost for perform such merge. The second solution is to enforce a one-to-one mapping between the states. This results in $n_2!$ possible alignments. Since our HMMs may not have the same number of states, we need to consider the correct treatment for unmatched states. Another issue with the distance measure is that KLD is asymmetric while most standard graph matching or dynamic programming problems assume a symmetric cost function. Our approach is to treat these cases as if the state in question were matched to an imaginary null state $q^\Phi$ whose self-transition probability is a small value $\epsilon$ and out-going transition probabilities equaling the stationary vector (we should renormalize the transition probability, but this small inconsistency is ignored for now). The reasoning is that these rarely occurring null states with transitions resembling the combined effects of other existent states could have been added without significantly affecting the modeled distribution. Under this assumption, transition KLD in Eq. (4) is calculated by $$\tilde{D}(a_1^i \| a_2^\phi) = a_1^{ii} \log \frac{a_1^{ii}}{\varepsilon} + (1 - a_1^{ii}) \log \frac{1 - a_1^{ii}}{1 - \varepsilon}.$$

With this treatment, any pair of HMMs can be considered as always having the same number of states $n = \max(n_1, n_2)$, which helps mapping this to a shortest path problem.

Figure 12:
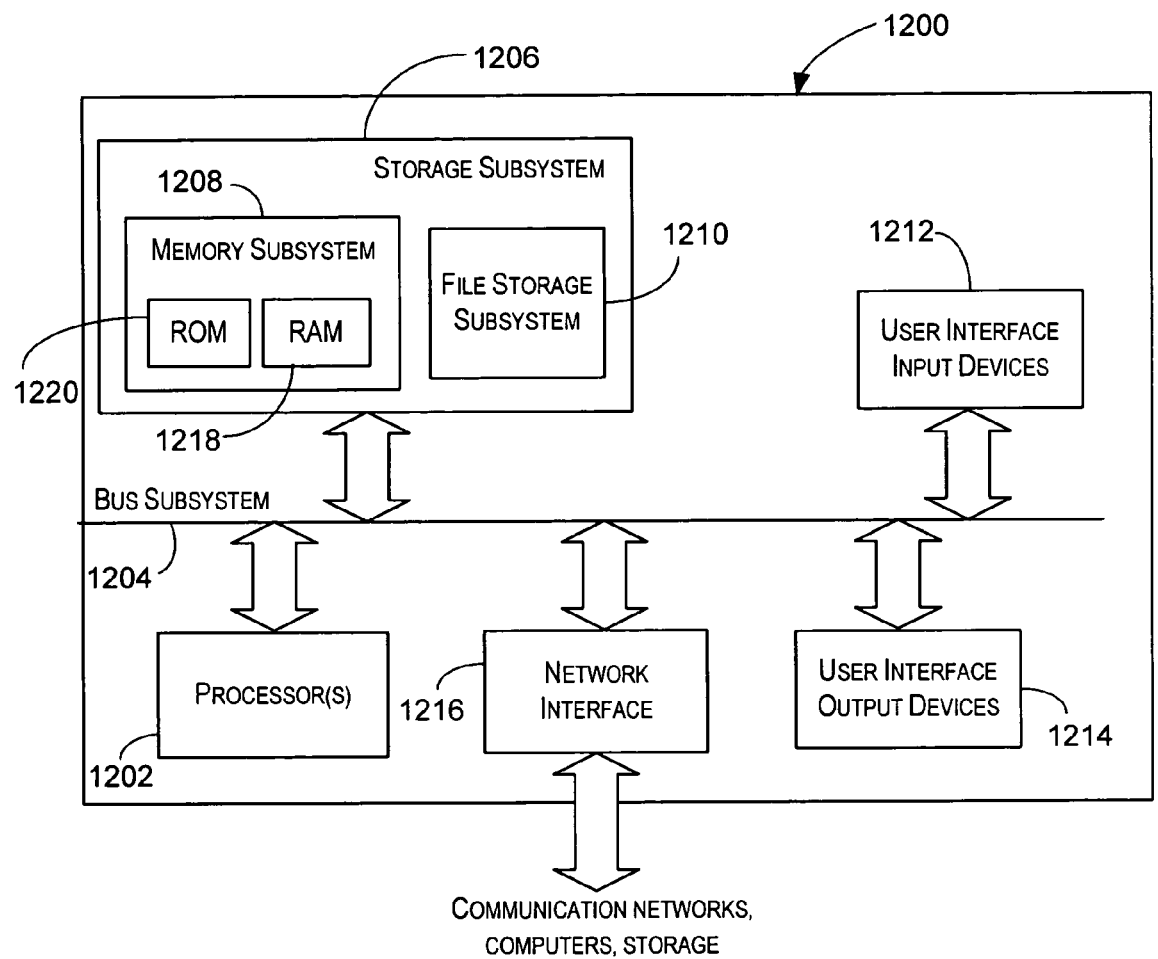
FIG. 12 is a simplified block diagram of data processing system that may be used to perform processing according to an embodiment of the present invention.

FIG. 12 is a simplified block diagram of data processing system 1000 that may be used to perform processing according to an embodiment of the present invention. As shown in FIG. 12, data processing system 1200 includes at least one processor 1202, which communicates with a number of peripheral devices via a bus subsystem 1204. These peripheral devices may include a storage subsystem 1206, comprising a memory subsystem 1208 and a file storage subsystem 1210, user interface input devices 1212, user interface output devices 1214, and a network interface subsystem 1216. The input and output devices allow user interaction with data processing system 1202.

Network interface subsystem 1216 provides an interface to other computer systems, networks, and storage resources. The networks may include the Internet, a local area network (LAN), a wide area network (WAN), a wireless network, an intranet, a private network, a public network, a switched network, or any other suitable communication network. Network interface subsystem 1216 serves as an interface for receiving data from other sources and for transmitting data to other sources from data processing system 1200. For example, data processing system 1200 may access stored query and search models via network interface subsystem 1216. Embodiments of network interface subsystem 1216 include an Ethernet card, a modem (telephone, satellite, cable, ISDN, etc.), (asynchronous) digital subscriber line (DSL) units, and the like.

User interface input devices 1212 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information to data processing system 1200.

User interface output devices 1214 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term "output device" is intended to include all possible types of devices and ways to output information from data processing system 1200.

Storage subsystem 1206 may be configured to store the basic programming and data constructs that provide the functionality of the present invention. For example, according to an embodiment of the present invention, software modules implementing the functionality of the present invention may be stored in storage subsystem 1206. These software modules may be executed by processor(s) 1202. Storage subsystem 1206 may also provide a repository for storing data used in accordance with the present invention. Storage subsystem 1206 may comprise memory subsystem 1208 and file/disk storage subsystem 1210.

Memory subsystem 1208 may include a number of memories including a main random access memory (RAM) 1218 for storage of instructions and data during program execution and a read only memory (ROM) 1220 in which fixed instructions are stored. File storage subsystem 1210 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Bus subsystem 1204 provides a mechanism for letting the various components and subsystems of data processing system 1202 communicate with each other as intended. Although bus subsystem 1204 is shown schematically as a single bus, alternative embodiments of the bus subsystem may utilize multiple busses.

Data processing system 1200 can be of varying types including a personal computer, a portable computer, a workstation, a network computer, a mainframe, a kiosk, or any other data processing system. Due to the ever-changing nature of computers and networks, the description of data processing system 1200 depicted in FIG. 12 is intended only as a specific example for purposes of illustrating the preferred embodiment of the computer system. Many other configurations having more or fewer components than the system depicted in FIG. 12 are possible.

The present invention can be implemented in the form of control logic in software or hardware or a combination of both. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for searching objects using Hidden Markov Models (HMMs), the method comprising:
   receiving a query for a query object containing temporal information;
   constructing a query HMM for the query object, the query HMM including at least one of static and temporal components;
   determining weighting information for the components in the query HMM;
   comparing the query HMM with one or more search HMMs using the weighting information, wherein the comparison includes determining static difference values for the static components of the query HMM and the static components for a search HMM in the one or more search HMMs and determining temporal difference values for the temporal components of the query HMM and the temporal components for a search HMM in the one or more the search HMMs;
   generating a ranking score for each of the one or more search HMMs based on the comparing step; and
   presenting a ranked list of search results to a user based on the ranking score, whereby a user can access an object corresponding to at least one of the search HMMs likely to have content similar to content of the query object.

2. The method of claim 1, wherein the search results comprise one or more objects containing temporal information.

3. The method of claim 1, wherein the one or more search HMMs are generated based on the weighting information.

4. The method of claim 1, wherein comparing the one or more search HMMs with the query HMM comprises:
determining difference values between features in the query HMM and each search HMM in the one or more search HMMs.

5. The method of claim 4, further comprising determining weighted difference values using the weighting information and the difference values.

6. The method of claim 5, further comprising determining a total difference value based on the weighted difference values.

7. The method of claim 6, wherein determining the search results comprises ranking the one or more search HMMs based on their total difference values.

8. The method of claim 1, further comprising storing search HMMs in a database prior to receiving the query.

9. The method of claim 8, further comprising generating the search HMMs.

10. The method of claim 1, further comprising automatically generating the one or more search HMMs in response to receiving the query.

11. The method of claim 10, wherein the one or more search HMMs are generated based on the weighting information.

12. A method for searching objects containing temporal information, the method comprising:
receiving a query for a query object containing temporal information;
generating a query model for the query, the query model including query model static components and query model temporal components;
determining weighting information for the query model static components and query model temporal components;
comparing the query model with one or more search models for search objects containing temporal information using the weighting information, the one or more search models including search model static components and search model temporal components, wherein the comparison includes comparing the query model static components and query model temporal components with the search model static components and query model temporal components for each search model in the one or more search models; and
presenting a list of search results to a user based on the comparing step, whereby a user can access a search object corresponding to at least one of the search HMMs likely to have content similar to content of the query object.

13. The method of claim 12, wherein generating the query model comprises generating the query model based on the object containing temporal information specified.

14. The method of claim 12, wherein generating the query model comprises retrieving a query model stored for an object containing temporal information.

15. The method of claim 12, further comprising storing the one or more search models in a database prior to receiving the query.

16. The method of claim 15, further comprising generating the search models based on the search objects containing temporal information.

17. The method of claim 12, further comprising automatically generating the one or more search models in response to receiving the query.

18. The method of claim 17, wherein the one or more search models are generated based on the weighting information.

19. The method of claim 12, further comprising:
determining weighted static difference values using the weighting information; and
determining weighted temporal difference values using the weighting information.

20. The method of claim 19, further comprising determining a total difference value based on the weighted static difference values and the weighted temporal difference values.

21. The method of claim 20, wherein determining the search results comprises ranking the one or more search models based on their total difference values.

22. The method of claim 12, wherein the query model and one or more search models comprise HMMs.

23. A data processing system for searching objects using Hidden Markov Models (HMMs), the data processing system including a processor and a memory configured to store a plurality of instructions that, when executed by the processor, direct the data processing system to perform steps comprising:
receiving a query for a query object containing temporal information;
constructing a query HMM for the query object, the query HMM including at least one of static and temporal components;
determining weighting information for the components in the query HMM;
comparing the query HMM with one or more search HMMs using the weighting information, wherein the comparison includes determining static difference values for the static components of the query HMM and the static components for a search HMM in the one or more search HMMs and determining temporal difference values for the temporal components of the query HMM and the temporal components for a search HMM in the one or more the search HMMs;
generating a ranking score for each of the one or more search HMMs based on the comparing step; and
presenting a ranked list of search results to a user based on the ranking score, whereby a user can access an object corresponding to at least one of the search HMMs likely to have content similar to content of the query object.

24. The data processing system of claim 23, wherein the search results comprise one or more objects containing temporal information.

25. The data processing system of claim 23, wherein the one or more search HMMs are generated based on the weighting information.

26. The data processing system of claim 23, further comprising automatically generating the one or more search HMMs in response to receiving the query.

27. A data processing system for searching objects containing temporal information, the data processing system including a processor and a memory configured to store a plurality of instructions that, when executed by the processor, direct the data processing system to perform steps comprising:
receiving a query for a query object containing temporal information;
generating a query model for the query, the query model including query model static components and query model temporal components;

determining weighting information for the query model static components and query model temporal components;

comparing the query model with one or more search models for search objects containing temporal information using the weighting information, the one or more search models including search model static components and search model temporal components, wherein the comparison includes comparing the query model static components and query model temporal components with the search model static components and query model temporal components for each search model in the one or more search models; and presenting a list of search results to a user based on the comparing step, whereby a user can access a search object corresponding to at least one of the search HMMs likely to have content similar to content of the query object.

28. The data processing system of claim 27, further comprising automatically generating the one or more search models in response to receiving the query.

29. The data processing system of claim 28, wherein the one or more search models are generated based on the weighting information.

30. The data processing system of claim 27, wherein the query model and one or more search models comprise HMMs.

* * * * *